Nov. 16, 1965  C. S. WHITE  3,217,388
METHOD OF MAKING BEARINGS
Original Filed Nov. 4, 1955  2 Sheets-Sheet 1

INVENTOR.
Charles S. White
BY
Barnard, McGlynn & Reising
ATTORNEYS

Nov. 16, 1965  C. S. WHITE  3,217,388
METHOD OF MAKING BEARINGS
Original Filed Nov. 4, 1955  2 Sheets-Sheet 2

INVENTOR.
Charles S. White
BY
Barnard, McGlynn & Reising
ATTORNEYS

United States Patent Office 3,217,388
Patented Nov. 16, 1965

3,217,388
METHOD OF MAKING BEARINGS
Charles S. White, 35826 41st St., Palmdale, Calif.
Original application Nov. 4, 1955, Ser. No. 544,945, now Patent No. 2,804,886, dated Sept. 3, 1957. Divided and this application Feb. 10, 1964, Ser. No. 343,676
6 Claims. (Cl. 29—149.5)

This invention relates to low friction materials, and more particularly relates to a method for making and the fabrics which result from the use of such method and materials, and is a continuation of U.S. patent application, Serial No. 116,326, filed June 12, 1961, and now abandoned which was a division of U.S. patent application Serial No. 544,945, filed November 4, 1955, now U.S. Patent 2,804,886 and reissued as U.S. Reissue Patent 24,765.

Low friction plastic materials have had very limited use as bearings, seals, pistons and the like, for different reasons, some of which are failures at low temperatures, cold flow, change in physical characteristics under heating and pressure, and lack of bonding characteristics.

The present invention primarily employs plastic materials which themselves have low friction characteristics, and is based on the discovery that unexpectedly useful low friction surfaces are produced if plastic materials having relatively low friction characteristics are employed in the form of fibers. A supporting surface is provided which retains the fibers in position to resist cold flow during the period of relative movement between the surface carrying the low friction material and the opposed surface when the surfaces are loaded. Various attempts have been made to support the low friction materials so as to resist cold flow during use and due to the simplicity of handling and ease in manufacturing, the present invention contemplates the employment of the fibers in a woven form. By this means the fibers are disposed and supported so as to be substantially uniformly distributed in or on a supporting surface woven into the fabric.

The compound fabric material having the low friction fibers is bonded to a body made from suitable materials to form bearings, seals, pistons and the like. The body material which supports the uniformly distributed fibers may vary substantially, that is to say, such material may be thermosetting and thermoplastic resins, such as phenolaldehyde resins including particularly phenolformaldehyde resins, ureaformaldehyde resins, polyester resins, elastomeric materials including natural and synthetic rubbers and the urethanes. For application such as bearings or seals it will be apparent that the body material which is selected for any particular application must be one which has the ability to resist deformation and to retain its shape and properties under the temperature conditions resulting from use. It is therefore advisable to select a high temperature resistant material, preferably of the thermosetting type, such as phenolformaldhyde resins. It is to be understood that conventional fillers and tensile reinforcing fibers for such resinous materials may be incorporated if desired and are advisable where the resulting structure is to be subjected to relatively high unit pressures during use. For the worst condition normally encountered in bearing and sealing applications, glass fiber filled resins are especially satisfactory.

Fibers having low friction characteristics which have been found to be satisfactory for the purposes of this invention include the polyamide resins marketed under the name of nylon, the polyester resins marketed under the name Dacron, polyethylene, the polymeric fluorocarbon resins including tetrafluoroethylene, marketed under the trade name Teflon, and the monochlorotrifluoroethylene resins marketed under the trade names of Kel-F and Fluorothene, available from The M. W. Kellogg Co. and Union Carbide and Carbon Corp., respectively. For certain applications, vinyl chloride resin fibers, commerically available under the name Saran and marketed by Dow Chemical Company, are also useful. The tetrafluoroethylene resins are unusually superior to the other resin fibers for the purposes of this invention as they will withstand approximately 500° temperature, although it is to be understood that other fibers are satisfactory for lower temperature application and will even be preferred for certain applications because of lower cost and greater ease in manufacture, such as nylon and polyethylene fibers. The fibrous materials of this invention and the low friction surfaces prepared therefrom uniquely differ from solid bodies or sheets of the same material because in certain applications, where sheet materials have completely failed, fibers of that same material uniformly disposed and positively retained against flow on a similar surface have proved to be satisfactory. The low friction fiber material in most cases does not bond readily with other materials, and in order to assure a good bond, bondable fibers are woven on the reverse side of the woven low friction fibers so that on the working face of the resulting woven material a low friction surface will be provided and on the opposite face a bondable surface will be present. Thus assurance is had that the low friction fibers will be retained in position at all times since the bondable fibers are positively retained in position on the supporting material. For example, inherent resistance to bonding is possessed by the polymeric fluorocarbon resins and these fibers have been successfully woven on a conventional backing material such as cotton, rayon, nylon, wool, glass and the like, in such a manner that the working face carries uniformly distributed fuorocarbon resin fibers on its surface. In any arrangement fibers are employed on the working face having low friction characteristics, while dissimilar fibers or cords on the opposite face have bondable characteristics. This procedure facilitates the attachment of such fibers to the supporting body material directly by such fiber material or by the use of adhesion or bonding materials which will secure the cotton, rayon, wool, etc. thereto. Thus, the low friction face may be applied to a fabric having a bondable back face, to the face of a webbing material if body is desired back of the low friction face, or to the inner or outer sides of a fabric in sleeve form, with the opposite side having the bondable face.

In bearing and sealing applications, failure occurs when the low friction surface materials cold flow, spall or seize during use and although it has not been completely experimentally established, it is thought that the fibers are successful for the purpose of this invention relative to sheet materials because the fibers are much stronger in tensile strength than sheet material fabricated from exactly the same substance. For example, in the case of tetrafluoroethylene resins, the tensile strength is approximately twenty-five times greater than the tensile strength of the material in sheet form. The exceedingly high tensile strength for the tetrafluoroethylene resin in fiber or filament form provides substantial resistance against said flow which occurs when the resin is in sheet or block form. Adding to this substantial resistance against cold flow by the fibers and the secure anchor provided by the bondable cords woven to one face of the fibers, assurance is had that a permanent low friction surface is provided which resists wear, flow and deterioration.

The low friction materials of this invention have different characteristics and properties but may be broadly defined as materials having a coefficient of friction against polished steel of approximately 0.02 to 0.15, these coefficients being obtained in the absence of conventional lubrications and in dry form. The polymeric fluorocarbon resins are stable and useful at temperatures through 500° F. and even as high as 600° F. in certain cases, and it can well be appreciated that such fibers backed with glass fibers will withstand high temperatures without deforming while retaining the low friction characteristics.

In the United States patent of Charles S. White No. 2,835,521, a ball joint is illustrated having one element made from a plastic insert the shape of the ball which is set by the application of heat after the insert is shaped to the adjacent surface under pressure. When the compound fabric was secured to the insert with a surface of Teflon engaged with a mating polished surface, the joint was operated more than 600,000 times in the absence of a lubricant and under a load of 2200 pounds per square inch without any visible wear on the insert or surface. Under such a load the joint was expected to have a high breakaway characteristics, requiring a substantially greater force to initially move the joint than that required to move it thereafter. The breakaway load of the joint having the Teflon surface above described was surprisingly low, requiring no noticeable amount of applied force over that to move the joint after breakway. For example, ball joints, such as those employed in an automobile having a load of 1200 pounds per square inch thereon have a static and dynamic force requirement to produce movement of 1½ ft. pounds in each instance. After 300,000 cycles of operation, the force requirement was 1⅝ ft. pounds in both instances. In this test, a small amount of grease was applied to the metal face of the socket at the time of assembly. No wear or damage to the surfaces was found when examining the joint parts after the 600,000 cycles of operation.

Accordingly, it is an object of the invention to provide a method of making a universal bearing of the ball and socket type having a layer with low friction material on one face thereof accurately conformed to the surface of the ball by the socket member.

Other objects and features of novelty of the invention will be specifically pointed out or will become apparent when referring, for a better understanding of the invention, to the following description taken in conjunction with the accompanying drawings, wherein.

It is to be understood that various types of weaves may be employed for forming the compound fabric having on one side thereof the low friction fibers and on the opposite side thereof the bondable fibers. For example, when the compound fabric is employed for faces of seals, the bodies of which have elastomeric properties, the compound sleeve must be able to expand and contract with the elastomeric material and should offer no resistance to the application of pressure by the material of the seal. The weaves herein illustrated therefore are merely shown by way of example and not by limitation, as it is to be understod that in different applications different types of weaves will be employed.

Figure 1:
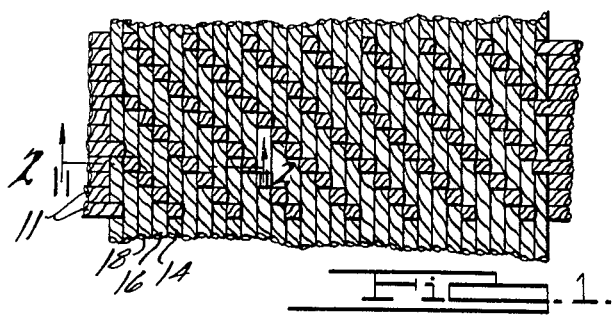
FIGURE 1 is a plan view of a fabric of the low friction type having bondable cords secured to one face thereof.
Figure 2:
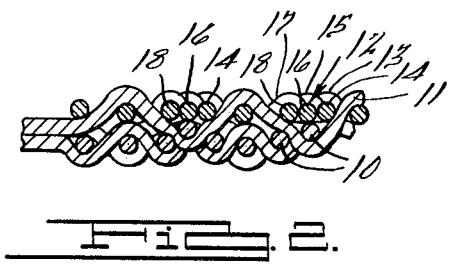
FIGURE 2 is an enlarged sectional view of the structure illustrated in FIGURE 1.

For a flat fabric, reference may be had to FIGURE 1 and 2 wherein one method of weave is illustrated for producing the compound fabric having the substantially solid surface of the low friction fibers and the bondable backing layer, substantially all of which is made up of bondable fibers. The low friction fibers 10 form the warp of the fabric, while the fibers 11 form the filler thereof. The layer of bondable cords 12 is disposed parallel to the warp cords 10 and is retained by having each of the filler cords 11 pick up a bondable cord 12 at certain spaced points, herein illustrated as every forth cord. The next adjacent filler cord 13 picks up the next adjacent bondable cord 14 and skips three of the adjacent bonding cords before picking up the next adjacent cord 14. The third filler cord 15 will pick up the next bonding cord 16 and will skip three bonding cords and pick up the next adjacent bonding cord 16. The fourth filler cord 17 will pick up the next adjacent bonding cord 18 and will skip three of the bonding cords until it picks up the next adjacent bonding cord 18. Thus, it will be seen that the greatest percentage of the bonding cord will be exposed for bonding purposes and will leave the opposite face of the fabric substantially solid with the warp cords 10 and the filler cords 11 of low friction material. A compound fabric is thus provided having low friction fibers on one face and bondable fibers or cords on the opposite face.

Figure 3:
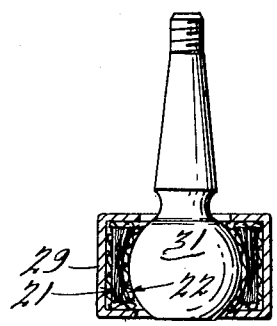
FIGURE 3 is a sectional view of a ball forming a joint, with a woven low friction fabric face of a strip of webbing, embodying features of the invention.
Figure 4:
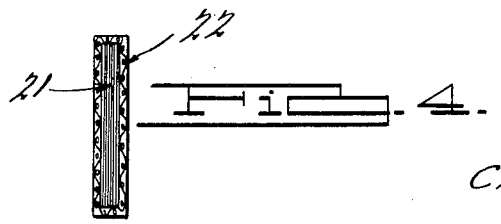
FIGURE 4 is a sectional view of a strip of webbing employed in the socket of FIGURE 3, before pressure is applied thereto.
Figure 5:
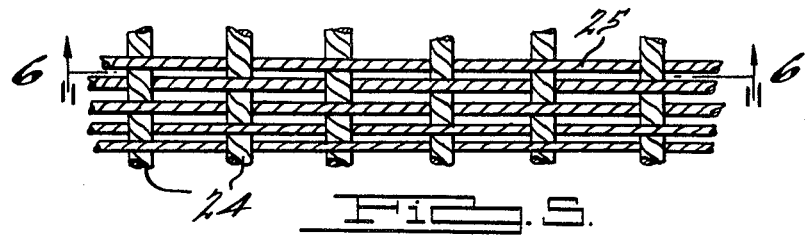
FIGURE 5 is an enlarged plan view of the low friction webbing material illustrated in FIGURE 4.
Figure 6:
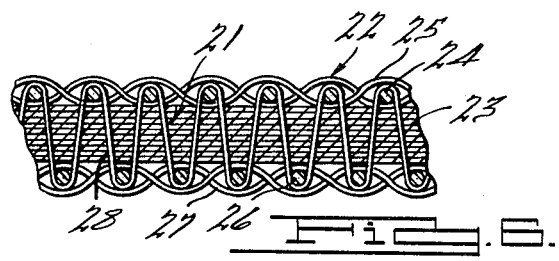
FIGURE 6 is a sectional view of the woven webbing material illustrated in FIGURE 5.

In FIGURES, 3 to 6, a webbing 21 is illustrated having on the face 22 thereof the low friction fibers. The face of the webbing is woven somewhat as a sleeve about a plurality of lengths of cords 23 which fill the interior of the sleeve and provide body to the resulting web. The one face 22 has warp cords 24 and filler cords 25 of the low friction fibers woven together at the same time that warp cords 26 of cotton or other material are woven with filler fibers 27 of cotton or other material on the other face. The front and rear woven portions of the webbing are tied together by the cords 28 which securely retain the free lengths of cords 23 in position therebetween. The low friction webbing may be employed, as illustrated in FIGURE 3, within a channel-shaped socket 29 which retains the webbing under pressure, with the low friction face encompassing the ball portion 31 of the resulting ball joint. In such an arrangement, it may be desired to have the body cords 23 coated with a wax, grease, graphite and like materials so that the cords will readily shift when the flanges of the socket 29 are forced downwardly into parallel relation as illustrated in the figure. This produces the desired amount of pressure between the face of low friction material of the webbing and the ball which permits the initial movement of the ball without requiring a substantial breakway force, permitting a uniform movement under a uniform pressure. It is to be understood that when depth is desired to the low friction face, the opposite face of the webbing, being of cotton or like material, may be bonded to other body materials to which the low friction material will not bond.

Figures 7, 8:
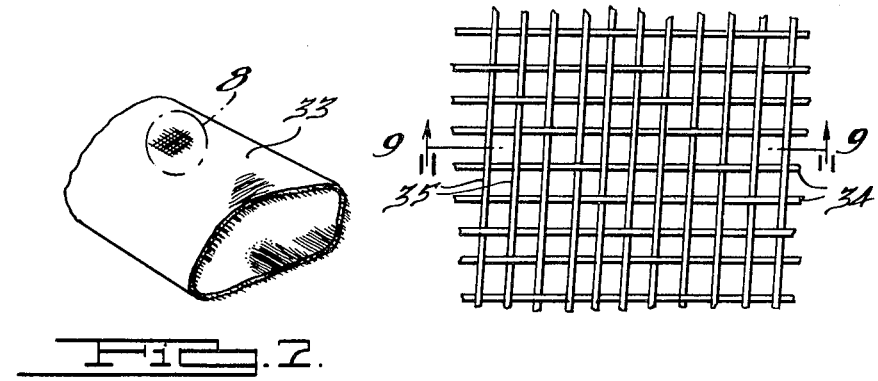
FIGURE 7 is a perspective view of a sleeve woven to have a low friction surface on the inner face thereof, made in accordance with the present invention.
FIGURE 8 is an enlarged view of the weave employed to construct the sleeve, as viewed within the circle 8 of FIGURE 7.
Figure 9:
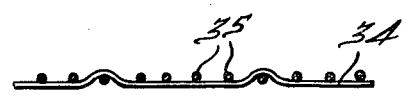
FIGURE 9 is a sectional view of the structure illustrated in FIGURE 8, taken on the line 9—9 thereof.

In FIGURES 7, 8 and 9, a further form of the invention is illustrated, that wherein a sleeve 33 is woven from low friction fibers and a cord of bondable material. In this arrangement, the cord of bondable material 34 skips four cords of the low friction material 35 as it is continuously wound into cylindrical form. The cord 34 engages an adjacent cord 35 each revolution while skipping the cord 35 priorly engaged so that as the cord 34 is wound in cylindrical form at the end of five turns it will have engaged each of the five cords 35 of all of the groups of the low friction cords 34. It is contemplated that a sleeve of such material may be placed along the inner surface of bearing seals and the like, as illustrated in the United States patent of Charles S. White No. 2,906,552. When the material of the seal has substantial movement, the sleeve of low friction material must contract or expand therewith, in which case the elastic hosiery weave known in the art is preferably employed in constructing the sleeve. The sleeve of the low friction material woven with the elastic hosiery weave will not restrict the expansion and contraction of the body material of the seal. It was pointed out above that the various weaves were herein illustrated by way of example and not to be considered limiting since other types of known weaves may better be employed for certain applications of the resulting fabric, webbing and sleeve materials. It is to be understood that the woven material of low friction fibers may be applied to strips of packing material to form a face thereon which, when compressed about a stem or rod within a packing gland, will have low friction engagement therewith. Such a packing material could be provided by the webbing 23 if all of the outer surface contained the low friction fibers. It is also to be understood that the low friction fibers could be retained upon a layer of material to which it is secured by bonding, weaving or the like to prevent the cold flow of the fibers when subjected to pressure. The specific examples recited herein are not to be considered limiting as the low friction fibers may be secured to a layer of material by other means not specifically recited, and the weave employed in producing the fabric may take any form known in the art to be suitable.

What is claimed is:

1. In a method of making a universal bearing of the ball and socket type in which an inner metal ball-like element having an outer spherical surface is seated within a unitary outer metallic ring member, the improvement which comprises providing on the inner surface of a metallic ring member of cylindrical form a layer of fabric of bondable yarns and Teflon yarns woven together with said bondable yarns on one surface of said fabric and the Teflon yarns exposed on the other surface of said fabric, assembling a metal ball-like element within said ring member and forcing the end portions of said ring member toward the ball-like element to convert the inner surface of said layer of fabric to a spherical form conforming to the outer spherical surface of said ball-like element whereby the ball-like element is locked in position within said ring member against axial displacement with the exposed Teflon yarn in surface contact with said ball and forming a bearing surface therefor.

2. In a method of making a universal bearing of the ball and socket type in which an inner metal ball-like element having an outer spherical surface is seated within a unitary outer metallic ring member, the improvement which comprises providing on the inner surface of a metallic ring member of cylindrical form a layer of fabric of bondable yarns and Teflon yarns woven together with said bondable yarns on one surface of said fabric and in contact with the inner surface of said ring and the Teflon yarns exposed on the other surface of said fabric, assembling a metal ball-like element within said ring member and forcing the end portions of said ring member toward the ball-like element to convert the inner surface of said layer of fabric under pressure to a spherical form conforming to the outer spherical surface of said ball-like element whereby the ball-like element is locked in position within said ring member against axial displacement with the exposed Teflon yarn in surface contact with said ball-like element and forming a bearing surface therefor.

3. In a method of making a universal bearing of the ball and socket type in which an inner metal ball-like element having an outer spherical surface is seated within an outer metallic ring member, the improvement which comprises providing on the inner surface of a metallic ring member a layer of fabric having low friction fibers on the inner surface thereof, assembling a metal ball-like element within said ring member and forcing the end portions of the ring member toward said ball-like element to apply pressure for conforming the inner surface of said layer of fabric to the outer spherical surface of said ball-like element whereby the ball-like element is locked in position within said ring member against axial displacement with the exposed low friction fibers in surface contact with said ball-like element and forming a bearing surface therefor.

4. The method as defined in claim 3 wherein said last-mentioned step comprises forcing the end portions of the ring member toward said ball-like element in a manner to form generally radially inwardly extending flanges at opposite ends of said ring member, the diameter of the opening defined by the flanges at each end of the ring member being less than the major diameter of said ball-like element whereby the flanges retain the fabric layer therebetween and positively mechanically lock the ball-like element within the ring member.

5. The method as defined in claim 3 wherein said first-mentioned step comprises providing on the inner surface of said metallic ring member a layer of fabric having low friction polytetrafluoroethylene fibers on the inner surface thereof.

6. In a method of making a universal bearing of the ball and socket type in which an inner metal ball-like element having an outer spherical surface is seated within an outer ring member, the improvement which comprises providing on the inner surface of a ring member a woven fabric having spaced plies forming opposite faces thereof with a plurality of stuffer cords therebetween, one of said plies having threads of tetrafluoroethylene material therein to provide a low friction surface on the outer face thereof, the other of said plies having threads of bondable material therein to provide a bondable surface on the outer face thereof in contact with the inner surface of said ring member, assembling a metal ball-like element within said woven fabric and ring member and forcing the ends of said ring member toward said ball-like element to conform said fabric to the outer spherical surface of said ball-like element whereby the ball-like element is locked in position within said ring member against axial displacement with the exposed tetrafluoroethylene threads in surface contact with said ball-like element and forming a bearing surface therefor.

References Cited by the Examiner

UNITED STATES PATENTS

| Re. 18,843 | 5/1933 | Skillman | 308—72 |
| Re. 24,765 | 1/1960 | White | 139—420 |
| 2,804,886 | 9/1957 | White | 139—420 |
| 2,835,521 | 5/1958 | White | 287—90 |
| 2,838,436 | 6/1958 | Clingman | 156—93 |
| 2,885,248 | 5/1959 | White | 308—239 |
| 3,019,821 | 2/1962 | White | 139—420 |

WHITMORE A. WILTZ, *Primary Examiner.*

THOMAS H. EAGER, *Examiner.*